Aug. 26, 1947.    R. I. KUFFLER    2,426,458
BACK-OFF MACHINE
Filed Aug. 30, 1944    9 Sheets-Sheet 2

Fig-2

INVENTOR
Roland I. Kuffler
BY
Attorney

Fig-4

Aug. 26, 1947.  R. I. KUFFLER  2,426,458
BACK-OFF MACHINE
Filed Aug. 30, 1944  9 Sheets-Sheet 5

INVENTOR
Roland I Kuffler
BY
Attorney

INVENTOR.
Roland I. Kuffler
BY
Attorney

Aug. 26, 1947.  R. I. KUFFLER  2,426,458
BACK-OFF MACHINE
Filed Aug. 30, 1944  9 Sheets-Sheet 9

INVENTOR.
Roland I. Kuffler
BY
Attorney

Patented Aug. 26, 1947

2,426,458

UNITED STATES PATENT OFFICE 2,426,458

BACK-OFF MACHINE

Roland I. Kuffler, Detroit, Mich., assignor of one-half to Samuel M. Renfrew, Hazel Park, Mich.

Application August 30, 1944, Serial No. 551,915

25 Claims. (Cl. 82—19)

This invention relates to improvements in back-off machines, and refers to such a machine which may be utilized for work wherein the flutes between the teeth are either straight or helical.

Another object of the invention is to provide a back-off machine wherein the main spindle is intermittently rotated and the cross slide is reciprocated, and the two movements are so synchronized that the main spindle is turned as the cross slide is moved toward the spindle axis and remains stationary during the return stroke of the cross slide.

Another object of the invention is to provide a back-off machine wherein a Geneva plate is utilized for imparting intermittent rotation to the main spindle and a Whitworth movement is employed for reciprocating the cross slide through an eccentric at a periodically varied speed, so that combination of these movements results in substantially the correct theoretical form being imparted to the backed-off surface.

A further object of the invention is to provide a back-off machine wherein the means for imparting intermittent rotation to the main spindle is so constructed and arranged that the speed of rotation increases during the first half of each intermittent movement and decreases during the second half of the movement, thereby minimizing the strains to which the machine is subjected, and virtually eliminating the sudden and violent shocks to which other machines for this purpose are usually subjected.

Another object of the invention is to provide a back-off machine wherein reciprocation is imparted to the cross slide through an eccentrically mounted circular member which coacts with the cross slide, thereby practically eliminating the sudden and violent shocks which result from the use of non-circular cams.

Another object of the invention is to provide a back-off machine wherein means are provided for adjusting the rotary distance through which the main spindle is turned during each movement, and, in cases where the flutes are helical, for augmenting this rotary distance proportionately to the longitudinal feed of the saddle on which the cross slide and tool are supported.

A further object of the invention is to provide a back-off machine including a differential drive in the means for rotating the main spindle intermittently, and a second differential drive in the means for reciprocating the cross slide, and separate manually operable means for adjusting the rotary position of the spindle and for adjusting the position of the cross slide along its stroke.

Another object of the invention is to provide such a back-off machine including indicating means to facilitate the rotary setting of the main spindle relative to the position of the cross slide along its stroke, so that the cross slide may be accurately set at its position nearest the spindle axis when the spindle and the work carried thereby are so turned that the tool on the cross slide is opposite the beginning of a flute in the work.

Yet another object of the invention is to provide a back-off machine including selective means for imparting constant rotation to the main spindle whereby reciprocation of the cross slide is eliminated, so that the machine may be employed for ordinary lathe work when it is not required for its primary purpose.

Having thus briefly and broadly stated some of the objects and advantages of the invention, I will now describe a preferred embodiment thereof with the aid of the accompanying drawings, in which.

Figure 4:
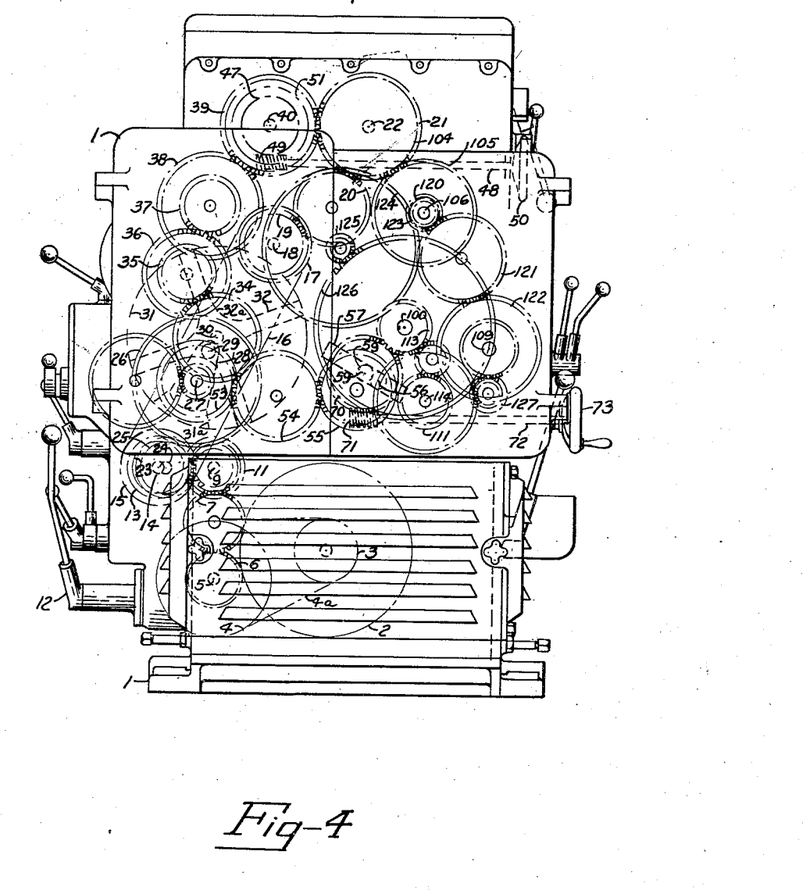
Figure 4 is an end elevation wherein the positions of some of the shafts and gearing are shown.
Figure 5:
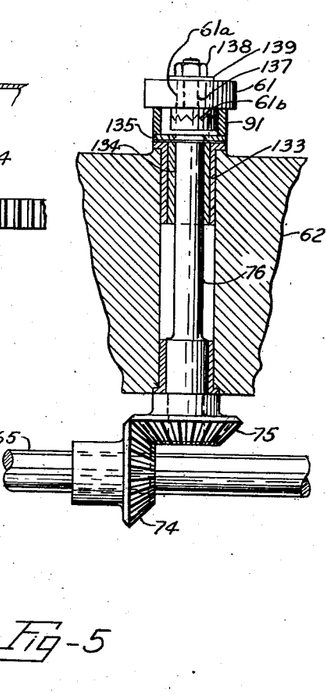
Figure 5 is a front elevation of the Geneva plate and the periodically varied drive for the cross slide which synchronizes with the Geneva movement.
Figures 6, 9:
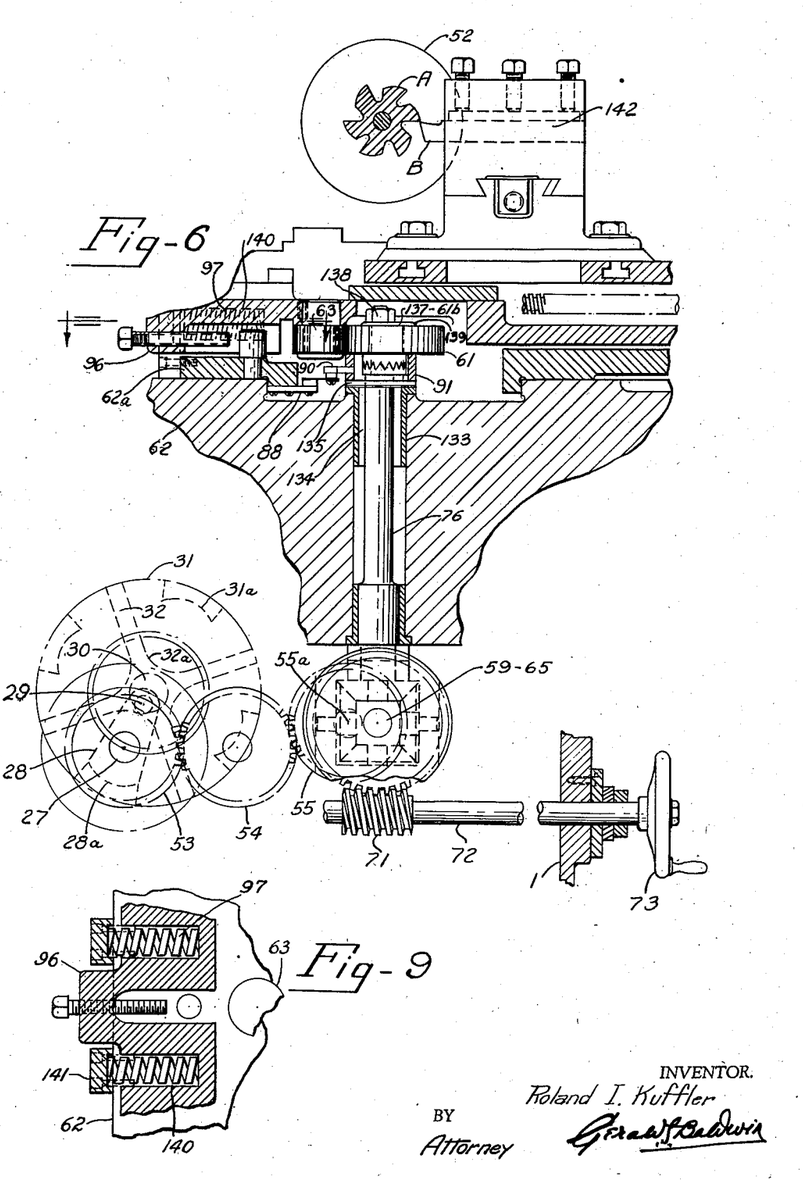
Figure 6 is an end view of Figure 5 showing the cross slide movement on the saddle; in this view the Geneva plate and gears are also indicated.
Figure 9 is a detail showing the spring means for holding a roller on the cross slide in engagement with an eccentric member by which the slide is reciprocated.
Figure 7:
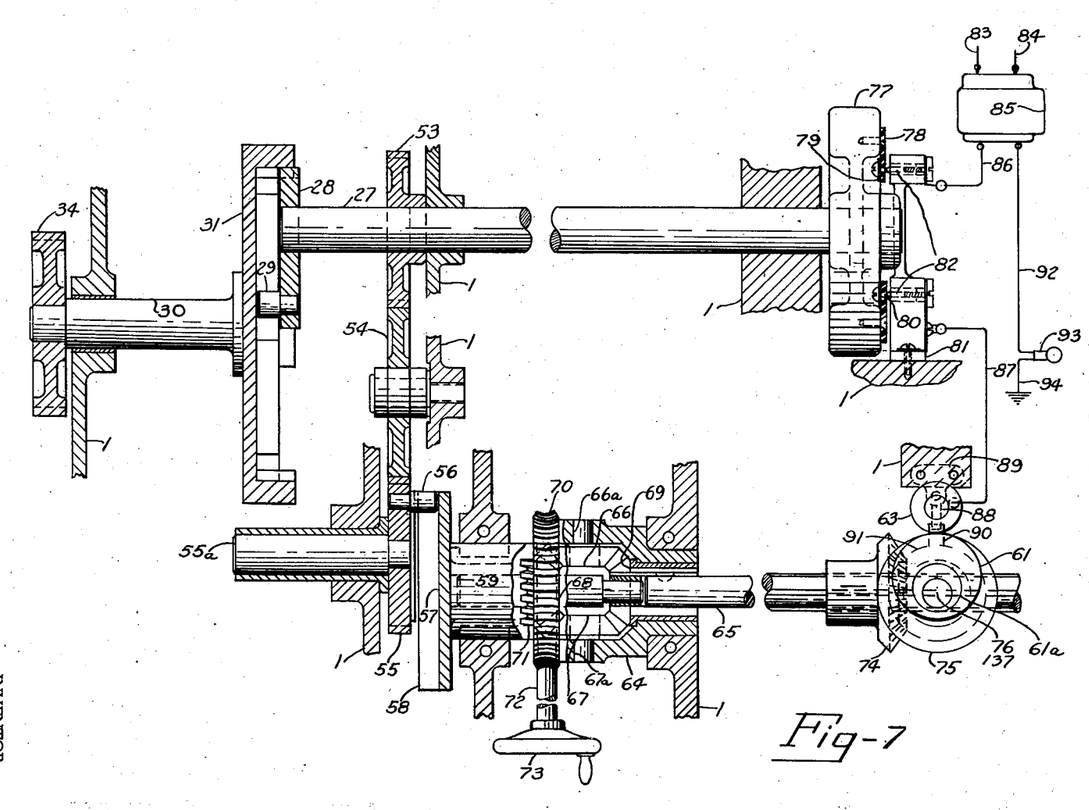
Figure 7 is a plan view of Figure 5 and also shows the electrical means for synchronizing the movement of the cross slide with the intermittent movement of the main spindle.
Figure 8:
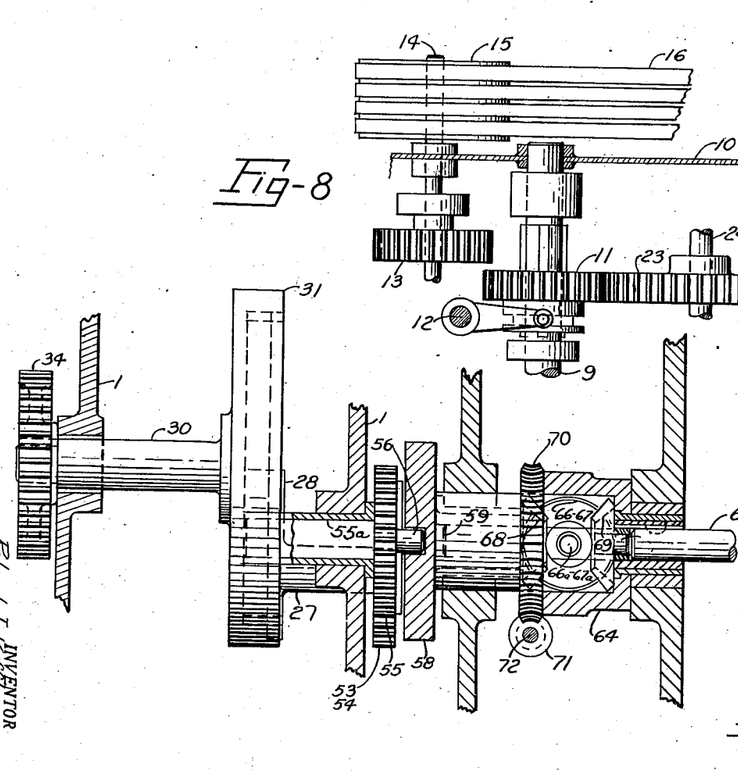
Figure 8 is a detail showing the means for changing from continuous to intermittent drive for the main spindle.
Figure 10:
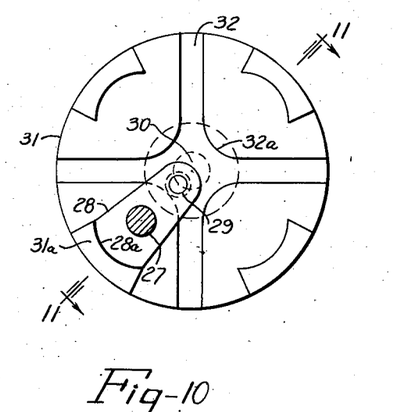
Figure 10 is a front view of the Geneva plate and some of the associated parts.
Figure 11:
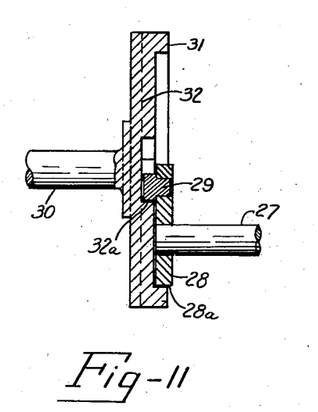
Figure 11 is a section on the line 11—11 of Figure 10.
Figures 12, 17:
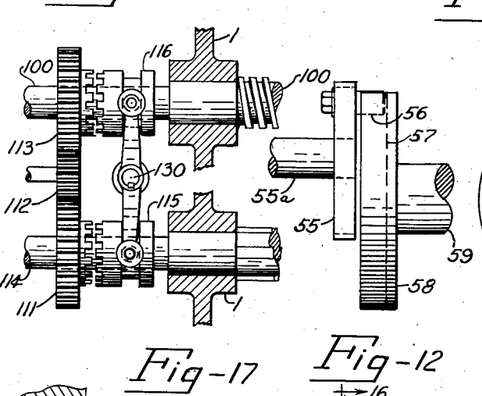
Figure 12 is a side view showing the means by which rotation at periodically varied speed is imparted to the eccentric member.
Figure 17 is another clutch detail.
Figure 13:
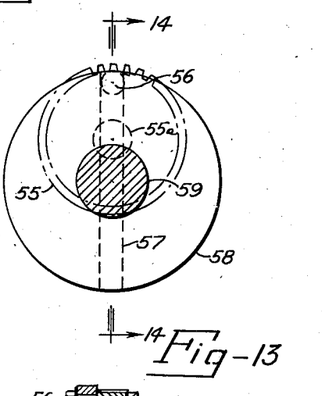
Figure 13 is a front view of Figure 12.
Figure 14:
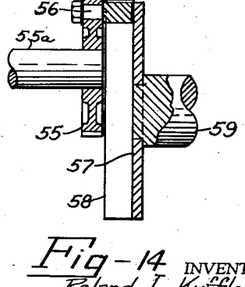
Figure 14 is a section on the line 14—14 of Figure 13.
Figure 15:
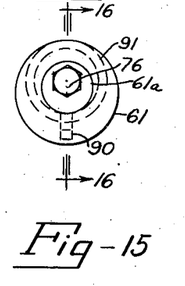
Figure 15 is an end view of the eccentric arrangement for actuating the cross slide.
Figure 16:
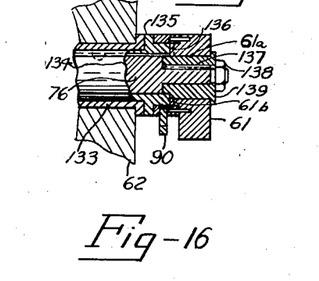
Figure 16 is a section on the line 16—16 of Figure 15.
Figure 18:
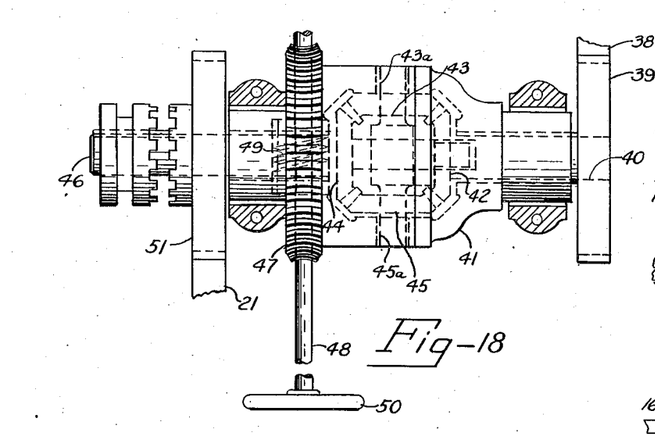
Figure 18 is a plan view showing the differential adjustment for the main spindle.
Figure 19:
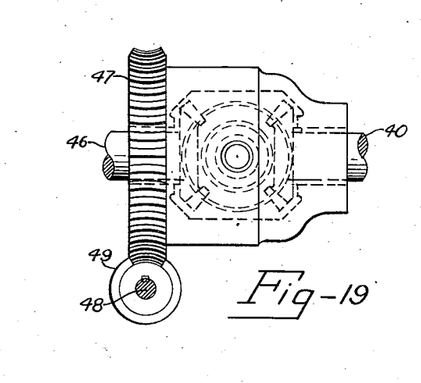
Figure 19 is a front view of Figure 18.
Figure 20:
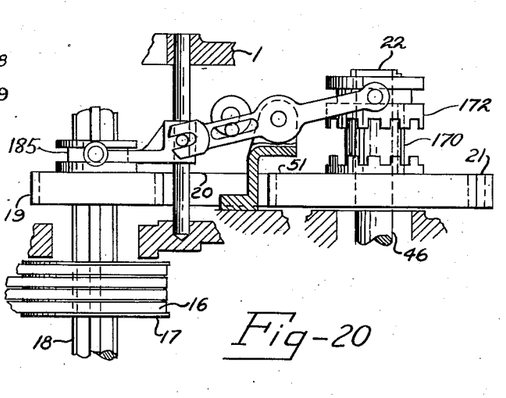
Figure 20 is a plan view showing declutching means for the continuous drive for the main spindle when the intermittent drive is employed.
Figure 21:
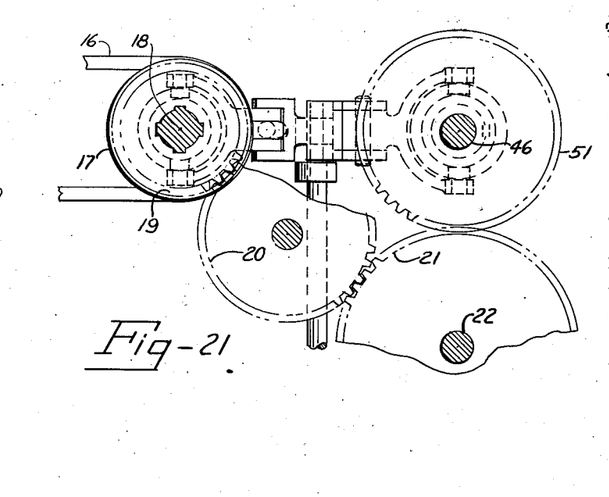
Figure 21 is an end view of Figure 20.

Referring to the drawings, 1 designates a frame of a machine having a main spindle 22 suitably mounted thereon for rotation. While during performance of the backing-off operation this spindle is intermittently turned it is also desirable at times to rotate it constantly at a uniform speed, and therefore selective means are provided whereby intermittent or constant rotation may be imparted to the said spindle 22 through a gear box 10. In the present instance a motor 2 is provided having a pulley 3 thereon which, through a belt 4a, turns a pulley 4 on a shaft 5 extending through one side of the gear box 10. Suitable gearing and associated shifter means are provided in this gear box for selectively rotating either of the shafts 14 or 24 through manipulation of a shifter handle 12. One preferred arrangement of this gearing is indicated in Figures 4, 8, and 20, wherein a gear 6 fixed on the shaft 5 drives a gear 8 on a shaft 9 through an intermediate gear 7. Axially movable on the shaft 9 through the shifter handle 12 is a gear 11 which may be moved either into mesh with a gear 13 fixed on a shaft 14 or into mesh with a gear 23 fixed on a shaft 24. When constant rotation of the main spindle 22 is required the gear 11 is moved into mesh with the gear 13 on the shaft 14 on which a pulley 15 is secured which turns a pulley 17 on a shaft 18 through belts 16, and a gear 19 slidable on the shaft 18 drives a gear 21 fixed on a sleeve 170 mounted on the main spindle through an intermediate gear 20. A clutch mechanism 185 is provided for sliding the gear 19 into and out of mesh with the gear 20 so that when the spindle is intermittently turned only the gears 20 and 21 are also rotated. A clutch 172 axially movable on the main spindle 22 is provided for engaging the sleeve 170 so that rotation of the gear 21 may be directly imparted to the said spindle.

To obtain intermittent rotation of the main spindle 22 the gear 11 is brought into mesh with the gear 23 thereby turning the shaft 24 on which another gear 25 is secured which engages a gear 26 fixed on the shaft 27. Secured also on the shaft 27 is a bellcrank 28 having a pin 29 projecting laterally therefrom. Fixed on a shaft 30 for rotation therewith is an internal Geneva plate 31 having radial slots 32 formed therein which are disposed at right angles to one another and into each of which in turn the pin 29 projects. The adjacent sides of each succeeding pair of slots 32 are curved from one to the other at their inner extremities as shown at 32a, and the axis of each curve 32a coincides with the axis of the shaft 27 when the latter is so positioned that the pin 29 is travelling from or into one of the slots 32 in which that curve terminates. Formed integral with the Geneva plate 31 are a plurality of shoes 31a the inner face of each of which is curved about an axis which coincides with the axis of the bellcrank 28 when the latter axis is positioned between the axis of the Geneva plate 31 and the center of that shoe 31a.

During 90 degrees of movement of the bellcrank 28, that is during movement of the pin 29 from one Geneva slot 32 to the next around a connecting curve 32a, the Geneva plate 31 remains stationary, during the next 135 degrees of movement of the bellcrank 28 the pin 29 turns the plate 31 through 45 degrees at an accelerating speed, and during the next 135 degrees of movement of the said crank the pin 29 turns the Geneva plate through 45 degrees at a decelerating speed. Thus during each complete revolution of the bellcrank 28 the Geneva plate 31 is turned through 90 degrees at the completion of which movement the said plate remains still momentarily. Each shoe 31a in turn receives the heel 28a of the bellcrank by which the Geneva plate is positively held against accidental rotation during the 90 degree movement of the bellcrank when the pin 29 is being moved from one slot 32 to the next.

On the shaft 30 is a gear 34 which through train gears 35, 36, 37, 38 and 39 rotates a shaft 40 having a differential adjustment unit including a housing 41 freely mounted thereon. The gears 34, 35, 36, and 37 are mounted upon their shafts for ready removal since the rotary distance the main spindle 22 travels between stops depends in part upon these gear ratios and it is therefore desirable to change them from time to time to suit different work. Mounted in the housing 41 are four meshing bevel gears 42, 43, 44 and 45. The gears 42 and 44 are fixed on shafts 40 and 46 respectively supported in axial alignment by the housing 41. Freely mounted on the shaft 46 is a worm wheel 47 which is fixed to the housing 41 to rotate therewith. Rotatably supported on the machine is an adjusting shaft 48 having a worm 49 thereon meshing with the worm wheel 47 and a handwheel 50, so that by turning the latter the worm wheel 47 and the housing 41 are rotated about the shaft 40 and the shaft 46 is turned. Fixed on the shaft 46 is a gear 51 which meshes with the gear 21 on the sleeve 170 which is freely rotatable on the main spindle 22. On the latter there is also a second freely rotatable sleeve 171 between which and the sleeve 170 an axially movable clutch 172 is provided to engage either sleeve and cause rotation of the said spindle. Thus by moving the clutch 172 into engagement with the sleeve 170 rotation of the latter drives the main spindle 22. On a countershaft 166 are back gears 167, 168 and 169. The gears 167 and 168 are connected to one another and mounted on splines on the shaft 166 so that the gear 167 may be moved into mesh with a gear 173 or the gear 168 may be moved into mesh with a gear 174, both the gears 173 and 174 being fixed on the sleeve 170. The gear 169 fixed on the shaft 166 is in constant mesh with a gear 104 on the sleeve 171, so that when either gear 167 or 168 is driven the gear 169 may impart rotation to the main spindle 22 by moving the clutch 172 into engagement with the sleeve 171. By the inclusion of this back gear arrangement the possible number of stops made during each revolution of the main spindle 22 may be greatly increased. Any conventional work supporting means such as a faceplate 52 may be provided on the main spindle 22 for supporting work A for rotation therewith, and the opposite extremity of the work may be carried by a conventional tailstock 52a.

Figure 1:
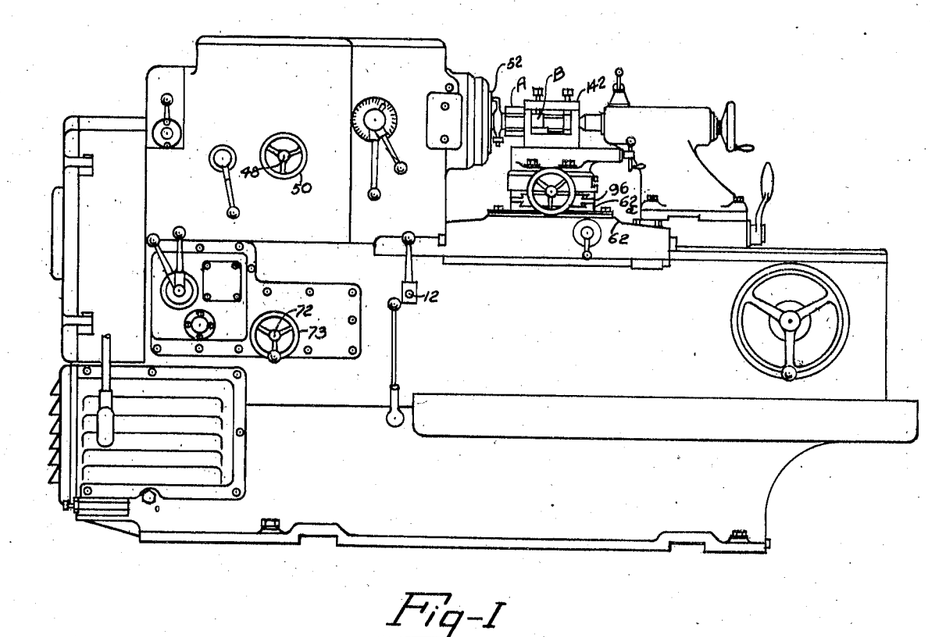
Figure 1 illustrates a front view of the machine.
Figure 2:
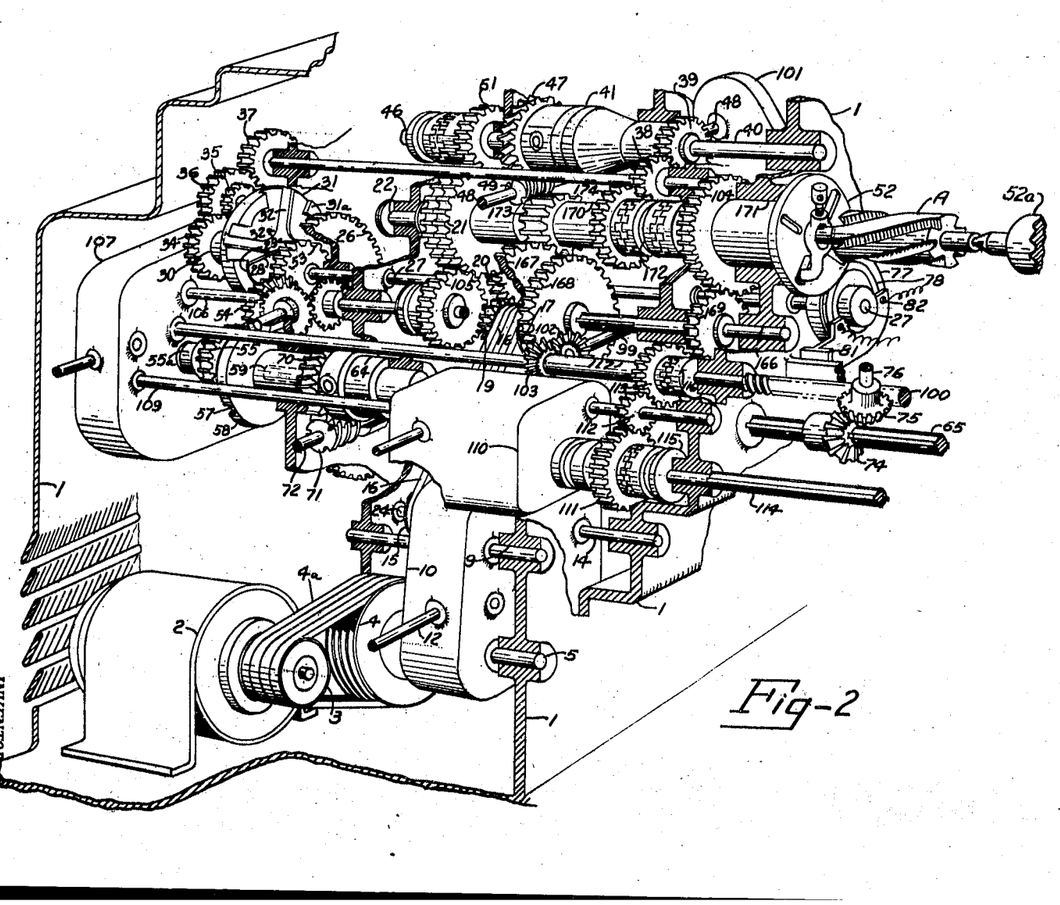
Figure 2 is an enlarged perspective view showing the head end of the machine.

One of the purposes of the differential adjustment above described is to permit rotary setting of the work A so that flutes thereon may be so positioned that a cutting tool B will have completed one tooth each time rotation of the main spindle ceases. Another purpose of this differential adjustment is to provide means for automatically advancing the rotary position of the work A when the flutes therein are helical as shown in Figure 2 proportionately to the longitudinal movement of the tool along the work and the helix angle of the flutes. The way in which this latter purpose is achieved is described hereinafter.

The gear 21 on the main spindle 22 also meshes with a gear 105 fixed on a shaft 106 which extends into a variable speed gear box 107 having suitable gearing therein such as the gears 120, 121 and 122 shown in Figure 4 to drive a shaft 109, and a gear 123 also on the shaft 106 which through intermediate gears 124 and 125 drives a gear 126 fixed on a feed screw 100. It will however be understood that the simplified gearing arrangement just described is merely illustrative as obviously a conventional change gear arrangement must also be included to provide for variation in the speed of rotation of the feed screw, and the latter in turn may impart longitudinal movement to a saddle 62 by engagement of a releasable split nut 100a thereon with the said feed screw. As already stated rotation of the main spindle 22 also turns the shaft 109. The latter terminates at one extremity in another variable speed gear box 110 from which a shaft 114 splined for the major portion of its length extends, though for the sake of simplicity in the drawings the splined shaft 114 is merely shown as being driven by a gear 127 in the box 110. Freely rotatable on the splined shaft 114 is a gear 111 and mounted on the said shaft for axial movement is a sliding clutch 115 to engage the gear 111. Meshing both with the gear 111 and with a gear 113 fixed on a sleeve 117 freely rotatable on the feed screw 100 is an intermediate gear 112; and axially movable on the feed screw 100 to engage the gear 113 is another sliding clutch 116. The clutches 115 and 116 are connected to a common rotary operating rod 130 so that when the clutch 115 engages its gear 111 the clutch 116 is released from its gear 113, and in central or neutral position of the rod 130 both gears 111 and 113 are disengaged from their respective clutches. When the clutch 116 is disengaged from the gear 113 and the clutch 115 is in engagement with the gear 111 rotation of the shaft 114 through the gears 111, 112 and 113 turns the sleeve 117 and a bevel gear 103 upon the latter turns a gear 102 on a cross shaft 99. The latter extends into a gear box 101 into which the shaft 48 also extends, where rotation of the shaft 99 turns the shaft 48 or vice versa. When the feed screw 100 is being employed to advance the saddle 62 the clutch 116 slidable on the feed screw engages the gear 113 on the sleeve 117 and drives the latter, the bevel gears 103 and 102, the shaft 99 and thus the shaft 48 through the gear box 101. If the splined shaft 114 is being utilized for moving the saddle longitudinally then the sleeve 117, and through it the shaft 48, is rotated through the gearing 111, 112 and 113 at which time the clutch 115 is in engagement with the gear 111 and the clutch 116 is disengaged.

The splined shaft 114 may also be utilized for moving the saddle 62 longitudinally. Axially movable on the splined shaft 114 is a bevel gear 153 which is retained in mesh with a gear 154 on a shaft 154a carried by the saddle 62. This shaft 154a through suitable gearing 155 drives a shaft 152 having a pinion 151 freely mounted for rotation thereon which meshes with a rack 150 carried by the frame 1. Also mounted on the shaft 152 for axial movement is a clutch 180 operated into and out of engagement with the pinion 151 by movement of the split nut 100a out of and into engagement with the feed screw 100. By rotation of a threaded member 181 the split nut is tightened around the feed screw 100 and by this movement of the nut the clutch 180 is disengaged from the pinion 151. Thus an exact feed in a longitudinal direction may be imparted to the saddle through the feed screw 100 or the saddle may also be similarly moved by rotation of the splined shaft 114. Again when the splined shaft 114 is not otherwise being turned it may be rotated by a handwheel 156 fixed on a spindle 156a mounted on the frame and having a gear 157 thereon which meshes with a gear 158 on the said splined shaft to move the saddle longitudinally.

On the shaft 27 is a gear 53 which through an intermediate gear 54 drives a gear 55 fixed on a shaft 55a. Extending from one side of the gear 55 is an eccentric drive pin 56 which extends into a transverse slot 57 formed in a plate 58 mounted on a shaft 59 which is supported in parallelism with but eccentric to the shaft 55a. As the gear 55 is rotated, due to its axis being out of alignment with the axis of the shaft 59 and the fact that the distance between the axis of the gear 55 and the center of the pin 56 is greater than the distance between the axes of the two shafts 59 and 55a, the speed of rotation of the shaft 59 alternately increases and decreases during each revolution. The distance between the axes of the gear 55 and the pin 56 is $\sqrt{2}$ times greater than the distance between the two shafts 59 and 55a. Then the shaft 59 turns through 180 degrees while the shaft 55 turns through 270 degrees; moreover these rotary movements occur while the Geneva wheel 31 turns through 90 degrees. During the other 180 degree movement of the shaft 59 the shaft 55a turns through 90 degrees to complete one revolution, and during this period the Geneva wheel 31 is at a standstill.

Freely mounted partly on the shaft 59 and partly on the shaft 65 is a differential adjustment unit including a housing 64. Mounted for rotation on opposed pins 66a and 67a carried by the said housing are bevel gears 66 and 67 respectively each of which meshes with gears 68 and 69 fixed on the shafts 59 and 65 respectively which are in axial alignment. A worm wheel 70 is secured to the housing 64 for rotation therewith; and meshing with the worm wheel 70 is a worm 71 fixed on a shaft 72 operated through a handwheel 73. Toward its opposite extremity and for the major portion of its length the shaft 65 is splined and axially movable thereon is a bevel gear 74 which meshes with a gear 75 on a vertical shaft 76 supported for rotation in the saddle 62 which is mounted for longitudinal movement. This differential is employed in a manner hereinafter described for setting the movement of a cross slide 96 on the said saddle to synchronize with the rotary position of teeth of the work A, as the cross slide and the tool B carried thereby must be nearest the axis of the work A when cutting on each tooth of the latter has just been completed and the tool is opposite the beginning of a flute. Then due to the timing of the main spindle 22 relative to the shaft 59, the former ceases to turn and the latter turns at a higher speed and brings the cross slide 96 back to its position farthest from the work axis to be in position to commence the next cut, that is to commence cutting on the next tooth of the work, when the main spindle is again rotated.

Supported vertically in the saddle 62 is a bushing 133 in which a sleeve 134 is mounted for rotation. This sleeve which is keyed to the shaft 76 is provided with an external flange 135 at its upper extremity which is rotatable on the top of the bushing 133. Formed on the upper face of the sleeve 134 are radial serrations 136 which engage corresponding serrations 61b formed on the lower face of an outer eccentric member 61. The shaft 76 terminates at its upper extremity beneath the top of the sleeve 134 in an upward projection 137 of reduced diameter, which extends through an inner eccentric element 61a on which the outer eccentric member 61 is mounted, and is threaded at its upper extremity to receive a nut 138. Formed on the upper extremity of the eccentric element 61a is an external flange 139 which projects over the top of the outer eccentric member 61 to hold the latter and the inner eccentric element 61a as a unit upon the shaft 76, to which the said element is keyed, for rotation with the said shaft after the eccentricity of the outer member 61 has been set to provide the required length of stroke for a cross slide 96 in a manner hereinafter described.

Mounted for transverse movement on the saddle 62 is a cross slide 96 having pockets 140 therein against the inner ends of which helical springs 97 are retained by plates 141 secured to an indexing ring 62a on the said saddle. These springs 97 tend to move the cross slide and retain a roller 63 rotatably mounted thereon in contact with the eccentric member 61 so that as the latter rotates the slide is reciprocated on the saddle 62 and ring 62a, and the tool B mounted in a holder 142 upon the said cross slide is moved angularly to the axis of the work A. Through the periodically varied speed of rotation of the shaft 59 the cross slide is moved relatively slowly toward the axis of the main spindle during which time the tool B is cutting, and is more quickly moved outwardly to bring the tool back into position to start cutting the next tooth of the work A. Moreover the intermittent rotary movement of the main spindle 22 is so synchronized with the cross slide movement that during rotation of the spindle the cross slide is moved toward the spindle axis and while the spindle remains stationary the cross slide is moved away from the said axis.

One of the preferred forms of arrangement for setting the rotary position of the work A relative to the movement of the cross slide 96 is as follows: Mounted on the shaft 27 is a flywheel 77 having an insulating ring 78 secured to one face thereof. Supported on the inner face of the ring 78 and spaced from the said flywheel is a contact ring 79 having diametrically opposed outwardly projecting contact pins 80 thereon which project through suitable apertures formed through the insulating ring 78. Supported on the frame 1 is a bracket 81 which is preferably annular and has diametrically opposed openings formed therethrough in which spring pressed contact points 82 are mounted so that each time the shaft 27 is turned through 180 degrees the pins 80 each make a contact with one of the points 82. 83 and 84 denote two power leads to a transformer 85 by which the incoming current is reduced to 6 volts. From the transformer one wire 86 runs to one of the contact points 82 and from the other contact point a wire 87 extends to a contact 88 mounted on an arm 89 insulated from and supported by an indexing ring 62a which is rotatable on the saddle 62 to turn with the cross slide 96 which is mounted for reciprocation on the said ring. In this manner provision is made for turning the slide 96 and the tool B angularly relative to the axis of the work A. The contact 88 is mounted in wiping relation with the contact 90 which is grounded on the machine. From the transformer 85 a second wire 92 extends to a light bulb 93 the other side of which is also grounded on the frame 1 through a lead 94.

When the rotary position of the shaft 27 is such that the contact pins 80 engage the points 82 the handwheel 73 is rotated until the eccentric member 61 is so positioned that a connection is made between the contacts 88 and 90 then the circuit is completed and the light bulb 93 is illuminated. The contact 90 is so positioned that it makes a connection with the contact 88 when the eccentric member 61 is so turned that the cross slide is at its most forward position and nearest the axis of the work A. The tool B must reach that position immediately prior to the time the Geneva plate 31 ceases to turn and causes stoppage of the main spindle 22; then the tool B and the cross slide 96 are moved outwardly from the spindle axis to the position to commence cutting the next tooth on the work prior to the time that the work A has been rotated sufficiently for the next tooth thereon to be contacted by the said tool.

From the foregoing it will be clearly seen that the number of stops made during each revolution of the main spindle may be varied over a wide range. The distance which the main spindle rotates during each movement may be increased or decreased by rotation of the worm wheel 47 either manually or through the gear box 101. The distance through which the cross slide is reciprocated may be varied by adjustment of the outer eccentric member upon the inner eccentric element. The speed of longitudinal movement of the saddle relative to the speed of rotation of the main spindle is controlled through gearing in the box 107 when the feed screw 100 is in engagement with the saddle and through the gears in the box 110 when the splined shaft 114 is employed for moving the saddle. The feed screw provides accurate movement of the saddle relative to the spindle rotation and the splined shaft provides approximately accurate movement thereof which is sufficiently close for longitudinal feeding of the tool. Through rotation of the shaft 72 the stroke of the cross slide 96 may be readily set to synchronize with the intermittent operation of the spindle 22 and the position of flutes on work A rotated with the said spindle. Again simple and easy means are provided for setting the rotary position of the eccentric member 61 so that its movement is correctly timed relative to the intermittent rotation of the main spindle 22.

Figure 3:
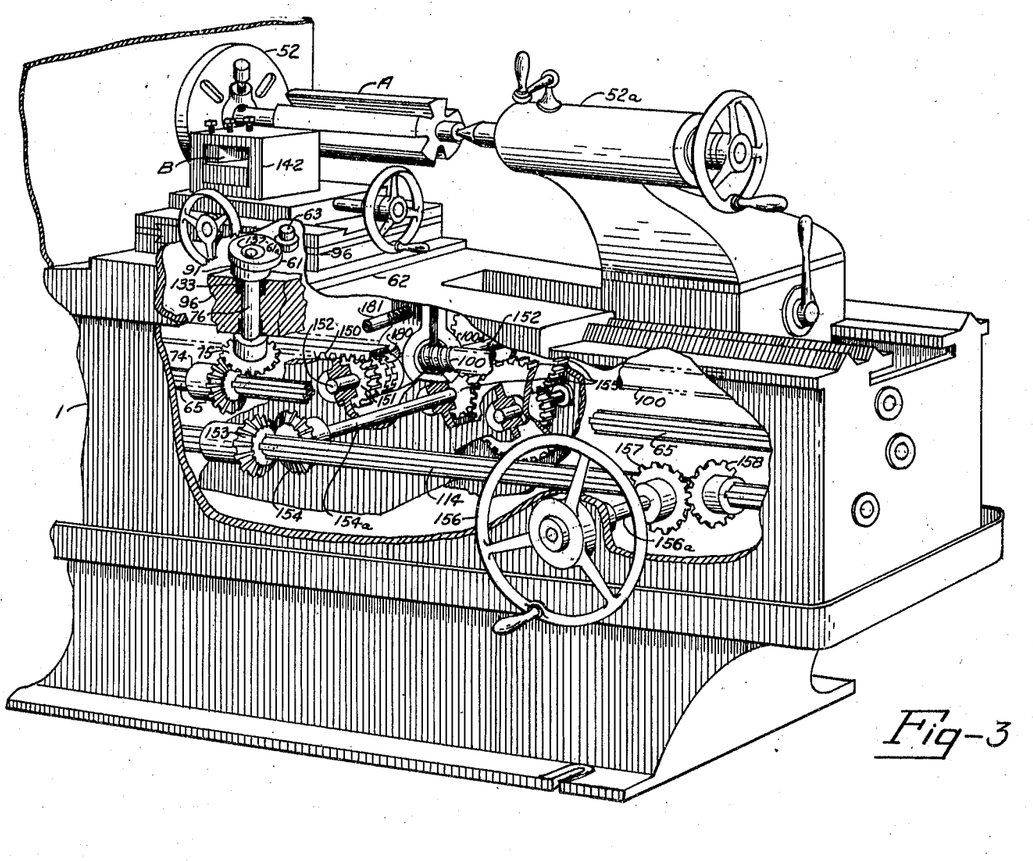
Figure 3 is a perspective view showing the tail end.

During the operation of the machine the main spindle 22 is rotated intermittently in one direction while the tool travels from one end of the workpiece to the other. When the workpiece has "teeth" or work faces which are continuous throughout its whole length as shown in both Figures 2 and 3, and in most other cases, the tool merely takes a narrow and longitudinally overlapping cut on each "tooth" or work face each time the latter passes, as is usual in lathe operations. If the flutes in the workpiece are straight as shown in Figure 3 the shaft 48 remains idle and the intermittent spindle movement is so set that during each movement it turns through 360° divided by the number of flutes in the workpiece. If the flutes are helical the setting of the main spindle movement is the same except that the shaft 48 is also turned—either by the feed screw 100 or the splined shaft 114 whichever is being employed for moving the saddle 62—to increase or decrease each angular movement of the spindle so that upon substantial completion of each revolution it has turned through 360° plus or minus (according to the direction in which the flutes are wound) the angular distance between two points on one "tooth" or work face initially contacted on two consecutive cuts. This angular distance depends on two things: The coarseness of the longitudinal feed of the saddle and tool, and the helix angle of the flutes. The adjustment for pitch or coarseness of the feed is automatically taken care of since the shaft 48 is turned either by the feed screw or the splined shaft; and the gear combination in the box 101 is selected according to the helix angle of the flutes. It will also be noted that adjustment of the length of the stroke of the cross slide is made by relative rotation of the circular eccentric member 61 and the eccentric element 61*a*, and due to the circular shape of the member the back-off form produced is correct irrespective of the length of the stroke.

While in the foregoing the preferred embodiment of the invention has been described and shown it is understood that alterations and modifications may be made thereto provided they fall within the scope of the appended claims; and again a detailed showing has not been made of the conventional change speed gearing arrangements employed since their use is old and their inclusion would merely complicate the drawings.

I claim:

1. A back-off machine including a continuous drive, a main spindle, means including a Geneva plate intermittently turned by the continuous drive for imparting intermittent rotation to the main spindle, a cross slide mounted for movement angularly to the axis of the main spindle, means actuated by the continuous drive for reciprocating the cross slide, and said means for reciprocating the cross slide and the means for imparting intermittent rotation to the main spindle being so synchronized that the cross slide is moved toward the main spindle axis during rotation of the spindle and away from said axis when the spindle is stationary.

2. A back-off machine including a continuous drive, a main spindle, a Geneva plate, means actuated by the continuous drive for intermittently rotating the Geneva plate, means for turning the main spindle when the Geneva plate is turned, means interposed between the Geneva plate and the main spindle for changing the angular distance through which said spindle is turned during each movement of the Geneva plate, a cross slide mounted for movement angularly to the axis of the main spindle, means actuated by the continuous drive for reciprocating the cross slide, and said means for intermittently rotating the Geneva plate and the means for reciprocating the cross slide being synchronized so that the cross slide is moved toward the main spindle axis during rotation of the spindle and away from said axis when the spindle is stationary.

3. A back-off machine including the combination set forth in claim 2, including a differential unit interposed between the Geneva plate and the main spindle, and manually operable means connected to said unit for turning the main spindle.

4. A back-off machine including a continuous drive, a main spindle, means operated by the continuous drive for intermittently turning the main spindle, a cross slide mounted for movement angularly to the axis of the main spindle, means including a Whitworth movement actuated by the continuous drive for reciprocating the cross slide and moving the latter at a higher rate of speed away from the spindle axis than toward the latter, and the means for intermittently turning the main spindle and the means for reciprocating the cross slide being synchronized so that the cross slide is moved toward the spindle axis when the spindle is turning and away from said axis when the spindle is stationary.

5. A back-off machine including a continuous drive, a main spindle, means including a Geneva plate intermittently turned by the continuous drive for intermittently turning the main spindle, a cross slide mounted for reciprocation angularly to the axis of the main spindle, means actuated by the continuous drive for reciprocating the cross slide whereby the reciprocation synchronizes with the intermittent rotation of the main spindle, said last named means including a differential drive, and manually operable means for turning the differential drive to initially position the reciprocating movement of the cross slide relative to the intermittent rotation of the main spindle.

6. A back-off machine including a continuous drive, a main spindle, means operated by the continuous drive for turning the main spindle intermittently, a cross slide mounted for reciprocation angularly to the axis of the main spindle, means actuated by the continuous drive for reciprocating the cross slide at a periodically varied speed, the last named means including two rotarily adjustable circular eccentrically mounted members arranged one within the other for actuating the cross slide whereby the length of stroke of the cross slide may be varied by relative rotary adjustment of the said members, and the means for intermittently turning the main spindle and the means for reciprocating the cross slide being synchronized so that the cross slide is moved toward the spindle axis when the spindle is turning and away from said axis when the spindle is stationary.

7. A back-off machine including a continuous drive, a main spindle, means including a Geneva plate intermittently turned by the continuous drive for intermittently turning said spindle, selective means interposed between the Geneva plate and the main spindle for changing the rotary distance through which the spindle is turned during each movement, a cross slide mounted for movement angularly to the axis of the main spindle, means operated by the continuous drive including an inner eccentric element and an outer eccentric member rotarily adjustable thereon for reciprocating the cross slide whereby the length of stroke of the latter may be adjusted, and the means for intermittently turning the main spindle and the means for reciprocating the cross slide being synchronized so that the cross slide is moved toward the spindle axis when the spindle is turning and away from said axis when the spindle is stationary.

8. A back-off machine including a continuous drive, a main spindle, means including a Geneva plate intermittently turned by the continuous drive for intermittently turning said spindle, a saddle mounted for longitudinal movement, a feed screw, means for turning the feed screw by rotation of the main spindle, releasable means on the saddle for engaging the feed screw whereby the saddle may be moved during rotation of the main spindle, a cross slide mounted for reciprocation on the saddle, means actuated by the continuous drive for reciprocating the cross slide, and the means for intermittently turning the main spindle and the means for reciprocating the cross slide being synchronized so that the cross slide is moved toward the spindle axis when the spindle is turning and away from the spindle axis when said spindle is stationary.

9. A back-off machine including a continuous drive, a main spindle, means including a Geneva plate intermittently turned by the continuous drive for intermittently turning said spindle, a saddle mounted for longitudinal movement, releasable means driven by rotation of the main spindle for moving the saddle, a cross slide mounted for reciprocation on the saddle, means actuated by the continuous drive for reciprocating the cross slide, and means actuated through the means for moving the saddle for increasing or decreasing the rotary distance through which the main spindle is turned during each movement.

10. A back-off machine including a continuous drive, a Geneva plate, means operated by the continuous drive for intermittently turning the Geneva plate, a main spindle, means rotated by the Geneva plate including a differential drive for turning the main spindle, means operated by rotation of the main spindle and through the differential drive for augmenting the rotary distance the main spindle is turned during each movement, a saddle, a cross slide thereon, means actuated by the continuous drive for reciprocating the cross slide whereby the movement of the latter is synchronized with the intermittent rotation of the spindle, means operated by the spindle rotation for moving the saddle, and the means for augmenting the rotary distance the main spindle is turned being operated by and proportionately to the saddle movement.

11. A back-off machine including a continuous drive, a shaft rotated thereby, a pin eccentrically mounted on the shaft, a Geneva plate mounted for rotation and having radial slots therein connected to one another at their inner extremities, said pin projecting into each slot in turn to impart intermittent rotation to said plate, a main spindle, means driven by the Geneva plate for turning said spindle including means for adjusting the angular distance through which said spindle is moved during each intermittent movement, a cross slide, and means actuated by the continuous drive for reciprocating the cross slide whereby movement of the latter is synchronized with the intermittent movement of the spindle.

12. In a back-off machine, the combination of a continuous drive, a main spindle, means operated by the continuous drive for imparting intermittent rotation to the main spindle, a shaft turned by the continuous drive, an eccentric drive pin carried by said shaft, a second shaft parallel but out of alignment with the first shaft, a plate on said second shaft having a transverse slot in one face into which said drive pin extends whereby rotation of the first shaft turns the second shaft at a periodically varying speed, a cross slide, and means driven by said second shaft for imparting reciprocation to the cross slide.

13. The combination set forth in claim 1, including a differential drive interposed between the Geneva plate and the main spindle for driving the latter, a shaft for turning the differential drive whereby the angular distance through which the main spindle is turned during each rotary movement is either increased or decreased according to the direction of rotation of said shaft, and means for turning the shaft.

14. The combination set forth in claim 1, including a drive mechanism operated by the continuous drive for intermittently turning the Geneva plate, a rotary element engageable with the main spindle for turning the latter, another drive mechanism operable by the continuous drive for continuously turning the rotary element, a clutch for selectively engaging either of said drive mechanisms with the continuous drive, and means for engaging or disengaging the rotary element with the main spindle.

15. A back-off machine including a continuous drive, a main spindle, means including a Geneva plate intermittently rotated by the continuous drive for intermittently turning the spindle, a saddle mounted for longitudinal movement, a shaft, means for turning the latter by rotation of the main spindle, a cross slide mounted for reciprocation on the saddle, means actuated by the continuous drive for reciprocating the cross slide at a periodically varied speed, the means for intermittently turning said spindle and the means for reciprocating the cross slide being so synchronized that the latter is moved toward the spindle axis when the spindle is turning and away from said axis when the spindle is stationary and releasable coacting means on the shaft and saddle for moving the latter during rotation of the main spindle whereby the cross slide may be moved longitudinally with the saddle during movement of the said slide relative to the axis of the said spindle, and means for engaging and releasing said coacting means.

16. A back-off machine including a continuous drive, a main spindle, means operated by the continuous drive for intermittently turning the spindle, a saddle mounted for longitudinal movement, releasable means driven by rotation of the main spindle for moving the saddle, a cross slide mounted for reciprocation on the saddle, and means including a Whitworth drive actuated by the continuous drive for reciprocating the cross slide at a periodically varied speed, the means for intermittently turning the main spindle and the means for reciprocating the cross slide being so synchronized that the cross slide is moved toward the spindle axis when the spindle is turning and away from said axis when said spindle is stationary.

17. A back-off machine including a continuous drive, a main spindle, means driven by the continuous drive for intermittently turning said spindle, a saddle mounted for longitudinal movement, releasable means driven by rotation of the main spindle for moving the saddle, a cross slide mounted for reciprocation on the saddle, means including a Whitworth drive actuated by the continuous drive for reciprocating the cross slide at a periodically varied speed, and means actuated by the means for moving the saddle for increasing or decreasing the rotary distance through which the main spindle is turned during each movement.

18. A back-off machine including a continuous drive, a main spindle, means on the spindle for rotating work having teeth thereon, means driven by the continuous drive for intermittently turning said spindle and work, a cross slide mounted for reciprocation angularly to the spindle axis, a tool on the cross slide, means including a Whitworth drive actuated by the continuous drive for reciprocating the cross slide at periodically varied speed, and the last named means also including a rotarily adjustable eccentrically mounted circular member for moving the cross slide whereby the length of the stroke of the latter may be adjusted to cut the back-off on teeth of various depths.

19. A back-off machine including a continuous drive, a main spindle, means on the main spindle for rotating a workpiece having teeth thereon, means including a Geneva plate turned by the continuous drive for intermittently rotating the spindle and workpiece, a cross slide mounted for reciprocation angularly to the spindle axis, means including a Whitworth drive actuated by the continuous drive for reciprocating the cross slide at periodically varied speed, the last named means including a rotarily adjustable circular member eccentrically mounted for moving the cross slide whereby the length of the reciprocating stroke is adjustable to suit the depth of the teeth on the workpiece, and the Geneva plate and the Whitworth drive being so synchronized that a proper back-off form is maintained at all rotary adjustments of the circular member.

20. In a machine, the combination of a continuous drive, a main spindle, a Geneva drive interposed between the continuous drive and the main spindle whereby intermittent rotation is imparted to the latter, a cross slide, means for reciprocating the cross slide angularly to the axis of the main spindle, a drive means including a Whitworth movement driven by the continuous drive for actuating the reciprocating means at periodically varied speed, and a differential adjustment interposed between the Whitworth movement and the reciprocating means by which the cross slide movement may be set in relation to the intermittent rotation of the main spindle so that the latter ceases to turn just after the cross slide reaches its inward limit of travel.

21. The combination in claim 20, including indicating means connected to the Geneva drive and to the reciprocating means for checking the synchronization of the spindle and cross slide movements.

22. The combination in claim 20, including electrical indicating means connected both to the Geneva drive and to the reciprocating means by which a signal is given when the spindle and cross slide movements are synchronized.

23. In a machine, the combination of a continuous drive, a main spindle, a Geneva drive interposed between the continuous drive and the main spindle whereby intermittent rotation is imparted to the latter, a cross slide, means for reciprocating the cross slide angularly to the axis of the main spindle, a drive means including a Whitworth movement driven by the continuous drive for actuating the reciprocating means at periodically varied speed, and a differential adjustment interposed between the Geneva drive and the main spindle by which the intermittent rotation of the main spindle may be set in relation to the reciprocation of the cross slide so that each time the spindle ceases to turn work rotated therewith is angularly correctly positioned relative to the cross slide.

24. The combination in claim 23, including indicating means connected to the Geneva drive and to the reciprocating means for synchronizing the angular position of the work at the conclusion of each rotary movement of the spindle relative to the position of the cross slide along its path of travel.

25. The combination in claim 23, including electrical indicating means connected to the Geneva drive and to the means for reciprocating the cross slide by which a signal is given when the angular position of the main spindle is synchronized with the position of the cross slide along its path of travel.

ROLAND I. KUFFLER.

REFERENCES CITED

The following references are of record in the file of this patent:

UNITED STATES PATENTS

| Number | Name | Date |
|---|---|---|
| 1,917,905 | Schellenbach | July 11, 1933 |
| 1,985,477 | Wolf | Dec. 25, 1934 |
| 2,124,213 | Shackleton | July 19, 1938 |
| 1,320,468 | Hampe | Nov. 4, 1919 |
| 1,396,292 | Shields | Nov. 8, 1921 |
| 1,429,617 | Muller | Sept. 19, 1922 |
| 1,700,327 | Mueller | Jan. 29, 1929 |
| 1,731,481 | Edgar | Oct. 15, 1929 |
| 1,744,783 | Mayo | Jan. 28, 1930 |
| 1,809,377 | Edgar | June 9, 1931 |
| 2,360,576 | Overstedt | Oct. 17, 1944 |